(12) United States Patent
Matsukawa

(10) Patent No.: US 6,925,079 B2
(45) Date of Patent: Aug. 2, 2005

(54) IP ADDRESS DUPLICATION DETECTION METHOD USING ADDRESS RESOLUTION PROTOCOL

(75) Inventor: Kenji Matsukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 722 days.

(21) Appl. No.: 09/790,542

(22) Filed: Feb. 23, 2001

(65) Prior Publication Data
US 2001/0017857 A1 Aug. 30, 2001

(30) Foreign Application Priority Data
Feb. 29, 2000 (JP) ........................................ 2000-055042

(51) Int. Cl.$^7$ ............................................. H04L 12/28
(52) U.S. Cl. ...................................... 370/389; 370/250
(58) Field of Search ................................. 370/241, 250, 370/389; 709/223, 224, 245

(56) References Cited

U.S. PATENT DOCUMENTS 5,229,988 A * 7/1993 Marbaker et al. ........... 370/245
5,724,510 A * 3/1998 Arndt et al. ................. 709/220

FOREIGN PATENT DOCUMENTS

| JP | 7-30564 | | 1/1995 |
|----|---------|---|--------|
| JP | 8-223169 | * | 8/1996 |
| JP | 09-266477 | | 10/1997 |
| JP | 10-126413 | | 5/1998 |
| JP | 11-074915 | * | 3/1999 |
| JP | 11-275119 | | 10/1999 |
| JP | 11-282644 | * | 10/1999 |
| JP | 2001-103086 | | 4/2001 |
| JP | 2001-230789 | | 8/2001 |

OTHER PUBLICATIONS

"What is an IP address?". Duke. Published on Internet at www.duke.edu/~yy7/ee156/ip_addr.pdf. Sep. 27, 1999. pp. 1–18.*

* cited by examiner

Primary Examiner—Chi Pham
Assistant Examiner—Derrick W Ferris
(74) Attorney, Agent, or Firm—Whitham, Curtis & Christofferson, PC

(57) ABSTRACT

An IP address duplication detection method using an address resolution protocol is used in a network system in which an IP address duplication diagnosis/detection host and a plurality of check target hosts are connected to a single LAN, all the hosts are respectively assigned MAC addresses as hardware addresses unique to devices without any duplication, and an address resolution protocol aimed at acquiring a MAC address of a remote device from an IP address is installed in each host. In this method, an ARP request packet containing a check target IP address in the same subnet as for the IP address duplication diagnosis/detection host is sent out from the IP address duplication diagnosis/detection host to each of the check target hosts through the LAN. IP address duplication is detected depending on whether an ARP reply packet as a response packet for the ARP request packet is returned from each of the check target hosts to the IP address duplication diagnosis/detection host through the LAN.

9 Claims, 3 Drawing Sheets

IP ADDRESS DUPLICATION DETECTION METHOD USING ADDRESS RESOLUTION PROTOCOL

BACKGROUND OF THE INVENTION

1. Field of the Invention

The present invention relates to an IP (Internet Protocol) address duplication detection method using an address resolution protocol and, more particularly, to a method of performing duplication diagnosis/detection of IP addresses set in network devices within a single subnet by using an address resolution protocol.

2. Description of the Prior Art

Different IP addresses are respectively assigned to network devices on an IP network. In some cases, however, duplicate IP addresses are assigned to devices.

In general, no address duplication occurs in the assignment of MAC addresses (Media Access Control Addresses= addresses for identifying the respective computers on a LAN) which are hardware addresses basically unique to the respective network devices.

An address resolution protocol (to be abbreviated as ARP hereinafter) is a protocol aimed at acquiring the MAC address of a remote device from an IP address. The present invention uses this ARP as an IP address duplication diagnosis/detection means by exploiting the characteristics of ARP under the condition that there is no MAC address duplication even though there may be IP address duplication.

Note that ARP is a protocol widely used as one of TCP/IP (Transmission Control Protocol/Internet Protocol) protocols, which is an optimal and effective protocol in terms of protocol versatility.

According to an automatic IP address setting method as the first prior art, which is disclosed in Japanese Unexamined Patent Publication No. 11-74915, in a client/server system, after identical IP addresses (default IP addresses) are registered in all clients to be connected, the server sends out an ARP request packet to a client. Upon reception of the packet, the client changes the IP address of its own on the basis of the reception time, and transmits the changed IP address to the server over an ARP reply packet, thereby managing IP addresses on the server.

According to a network device control method as the second prior art, which is disclosed in Japanese Unexamined Patent Publication No. 11-282644, network devices on a network are detected, and the IP addresses of the detected network devices are acquired. One network device is then designated among those on the network. An IP address that should be set for the designated network device is input, and the input IP address is compared with one or a plurality of IP addresses acquired in advance. If an identical IP address is detected upon comparison between the IP addresses, setting of an IP address is stopped. If no identical IP address is detected, the IP address is set, thus preventing IP address duplication with respect to other network devices.

Both the first and second prior arts have the purpose of preventing identical IP addresses from being assigned to a plurality of network devices.

Although different IP addresses are assigned to the respective network devices on an IP network, identical IP addresses may be assigned to devices due to a setting error caused by a network user.

If such IP address duplication occurs in a remote communication apparatus, communication may be performed with an unwanted remote communication apparatus.

Even if communication may be performed with a desired remote communication apparatus by chance, since an ARP cache table for managing the correspondence between remote IP addresses and remote MAC addresses is dynamically updated during communication, the current MAC address may be switched to other unwanted remote communication apparatuses at irregular intervals. In this case, packets cannot reach the desired remote communication apparatus. As a consequence, the established connection is abnormally disconnected.

In consideration of network management, demands have arisen for a method of detecting an IP address duplication fault like the one described above.

SUMMARY OF THE INVENTION

The present invention has been made in consideration of the above situation in the prior art to solve the above drawbacks in the prior art, and has as its object to provide a novel IP address duplication fault detection method which can meet the above demands in the prior art.

In order to achieve the above object, according to the first aspect of the present invention, there is provided an IP address duplication detection method using an address resolution protocol in a network system in which an IP address duplication diagnosis/detection host and a plurality of check target hosts are connected to a single LAN, all the hosts are respectively assigned MAC addresses as hardware addresses unique to devices without any duplication, and an address resolution protocol aimed at acquiring a MAC address of a remote device from an IP address is installed in each host, comprising sending out an ARP request packet containing a check target IP address in the same subnet as for the IP address duplication diagnosis/detection host from the IP address duplication diagnosis/detection host to each of the check target hosts through the LAN, and detecting IP address duplication depending on whether an ARP reply packet as a response packet for the ARP request packet is returned from each of the check target hosts to the IP address duplication diagnosis/detection host through the LAN.

According to the second aspect of the present invention, there is provided an IP address duplication detection method using an address resolution protocol in a network system in which an IP address duplication diagnosis/detection host and a plurality of check target hosts are connected to a single LAN, comprising inputting a check target IP address of the same subnet as for the IP address duplication diagnosis/detection host to the IP address duplication diagnosis/detection host, and sending out an ARP request packet from the IP address duplication diagnosis/detection host, setting the IP address duplication diagnosis/detection host in a wait state for an ARP reply packet as a response packet for the ARP request packet immediately after the ARP request packet is sent out, determining the presence/absence of a response by the ARP reply packet at the time of expiration of the wait state, terminating the processing upon determining the absence of an IP address matching the check target IP address on the check target hosts if a result of the determination of the presence/absence of a response indicates the absence of a response, and determining the number of ARP reply packets received if the result indicates the presence of a response by the ARP reply packet, and normally terminating the processing upon determining that one host has the check target IP address in the LAN, if a result of the determination of the number indicates that one ARP reply packet is received, and completing the IP address duplication diagnosis/detection upon determining that not less than two hosts have duplicate check target IP addresses in the LAN, if the result indicates not less than two ARP reply packets are received.

In each of the above aspects, all the hosts are respectively assigned MAC addresses as hardware addresses unique to devices without any duplication, and an address resolution protocol aimed at acquiring a MAC address of a remote device from an IP address is installed in each host.

Network addresses in IP addresses which are obtained by ANDing the IP addresses and a subnet mask, which are network addresses as in the same subnet, are set to be the same in the IP address duplication diagnosis/detection host and the check target hosts.

In addition, the ARP request packet is a packet forming ARP and is used to obtain a MAC address corresponding to an IP address by using a broadcast ability of the MAC address.

Furthermore, a duration of the wait state for an ARP reply packet set, which is set by the IP address duplication diagnosis/detection host, is set to a period of time in consideration of transfer time characteristics of the LAN and protocol processing times required by the IP address duplication diagnosis/detection host and the check target hosts.

Moreover, the ARP reply packet is a packet forming ARP and used in such a manner that a host having an IP address matching an IP address contained in an ARP request packet replies and notifies the IP address duplication diagnosis/detection host as an ARP request packet source host of the MAC address of the self-host by assembling the MAC address in the ARP reply packet.

According to the third aspect of the present invention, there is provided an IP address duplication detection method using an address resolution protocol in a network system in which an IP address duplication diagnosis/detection host and a plurality of check target hosts are connected to a single LAN, all the hosts are respectively assigned MAC addresses as hardware addresses unique to devices without any duplication, and an address resolution protocol aimed at acquiring a MAC address of a remote device from an IP address is installed in each host, comprising the steps of uniquely determining a host address range by inputting a subnet address of the same subnet as for the IP address duplication diagnosis/detection host to the IP address duplication diagnosis/detection host, extracting one IP address from the determined host address range, executing a search for all IP addresses in the corresponding range without any duplication/omission, terminating processing if no IP address is present in execution of the search, inputting, if an IP address is present, the extracted IP address as a check target IP address of the same subnet as for the IP address duplication diagnosis/detection host to the IP address duplication diagnosis/detection host, and sending out an ARP request packet from the IP address duplication diagnosis/detection host, setting the IP address duplication diagnosis/detection host in a wait state for an ARP reply packet as a response packet for the ARP request packet immediately after the ARP request packet is sent out, determining the presence/absence of a response by the ARP reply packet at the time of expiration of the wait state, terminating the processing upon determining the absence of an IP address matching the check target IP address on the check target hosts if a result of the determination of the presence/absence of a response indicates the absence of a response, and determining the number of ARP reply packets received if the result indicates the presence of a response by the ARP reply packet, and normally terminating the processing upon determining that one host has the check target IP address in the LAN, if a result of the determination of the number indicates that one ARP reply packet is received, and completing the IP address duplication diagnosis/detection upon determining that not less than two hosts have duplicate check target IP addresses in the LAN, if the result indicates not less than two ARP reply packets are received, managing each of states including "no assigned IP address", "normal IP address assignment", and "IP address duplication" as an assigned state result of each input IP address in the form of a list in a database in correspondence with each input IP address, and managing an assigned state of an unchecked IP address by executing the same detection processing on the basis of database management on an overall subnet level.

In the third aspect, a host address having all bits set to "1" or "0" is excluded in advance from addresses to be extracted when the IP address is extracted.

The present invention is configured and operates as described in the respective aspects. According to the present invention, a network fault due to IP address duplication can be detected, and hence network manageability improves.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF PREFERRED EMBODIMENTS

Several preferred embodiments of the present invention will be described below with reference to the accompanying drawings.

Figure 1:
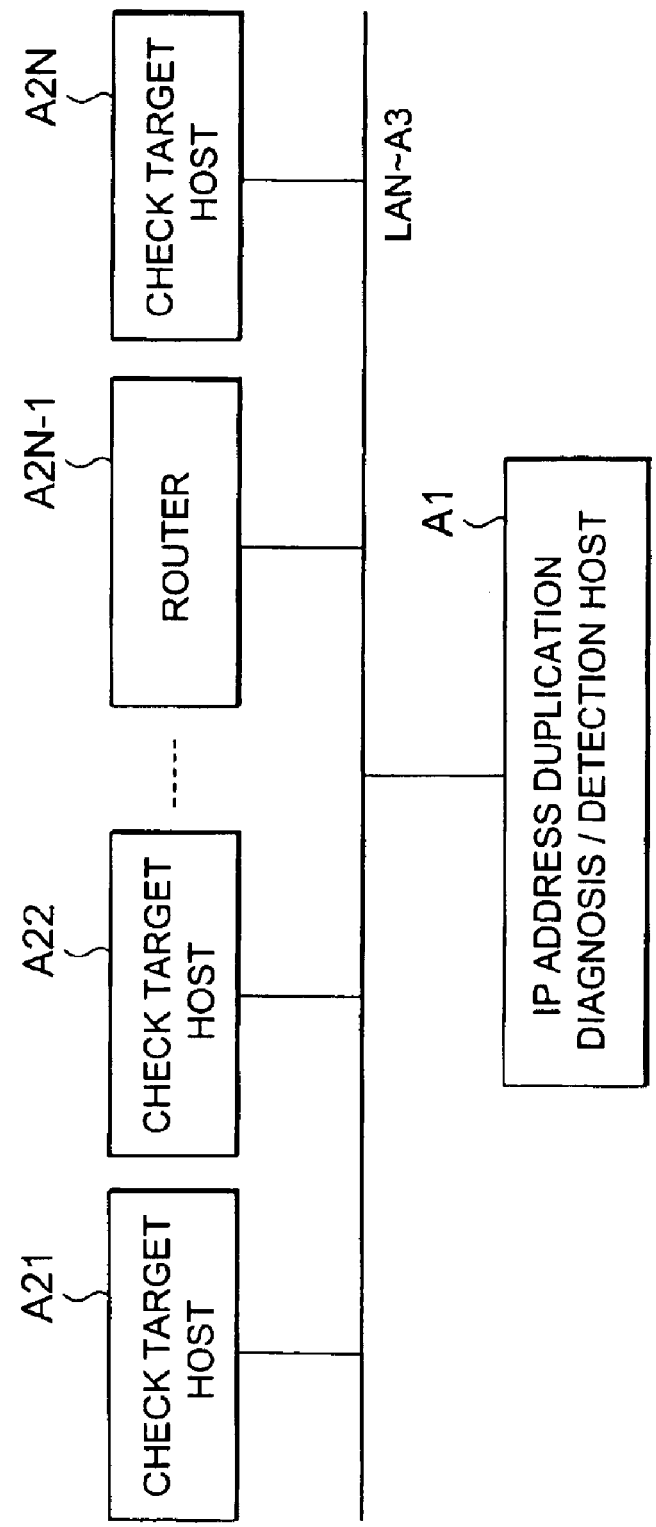
FIG. 1 is a block diagram showing the system configuration to explain the first embodiment of the present invention.

FIG. 1 is a view showing a system configuration to explain the first embodiment of the present invention.

Referring to FIG. 1, an IP address duplication diagnosis/detection host A1 and N check target hosts A21 to A2N are connected to a single LAN A3. A router serving as a network gateway, if any, is assigned to one of the check target hosts A21 to A2N.

MAC addresses which are hardware addresses unique to devices are respectively assigned to all the hosts A1 and A21 to A2N connected to the same LAN A3 without any duplication, and an address resolution protocol aimed at acquiring the MAC address of a remote device from an IP address is installed in each host.

In all these hosts A1 and A21 to A2N, network addresses as in the same subnet, i.e., the network addresses in the IP addresses which are obtained by ANDing the IP addresses and the subnet mask, are set to be the same.

Operation of an embodiment of an IP address duplication detection method using an address resolution protocol according to the present invention will be described in detail next with reference to the accompanying drawings.

Figure 2:
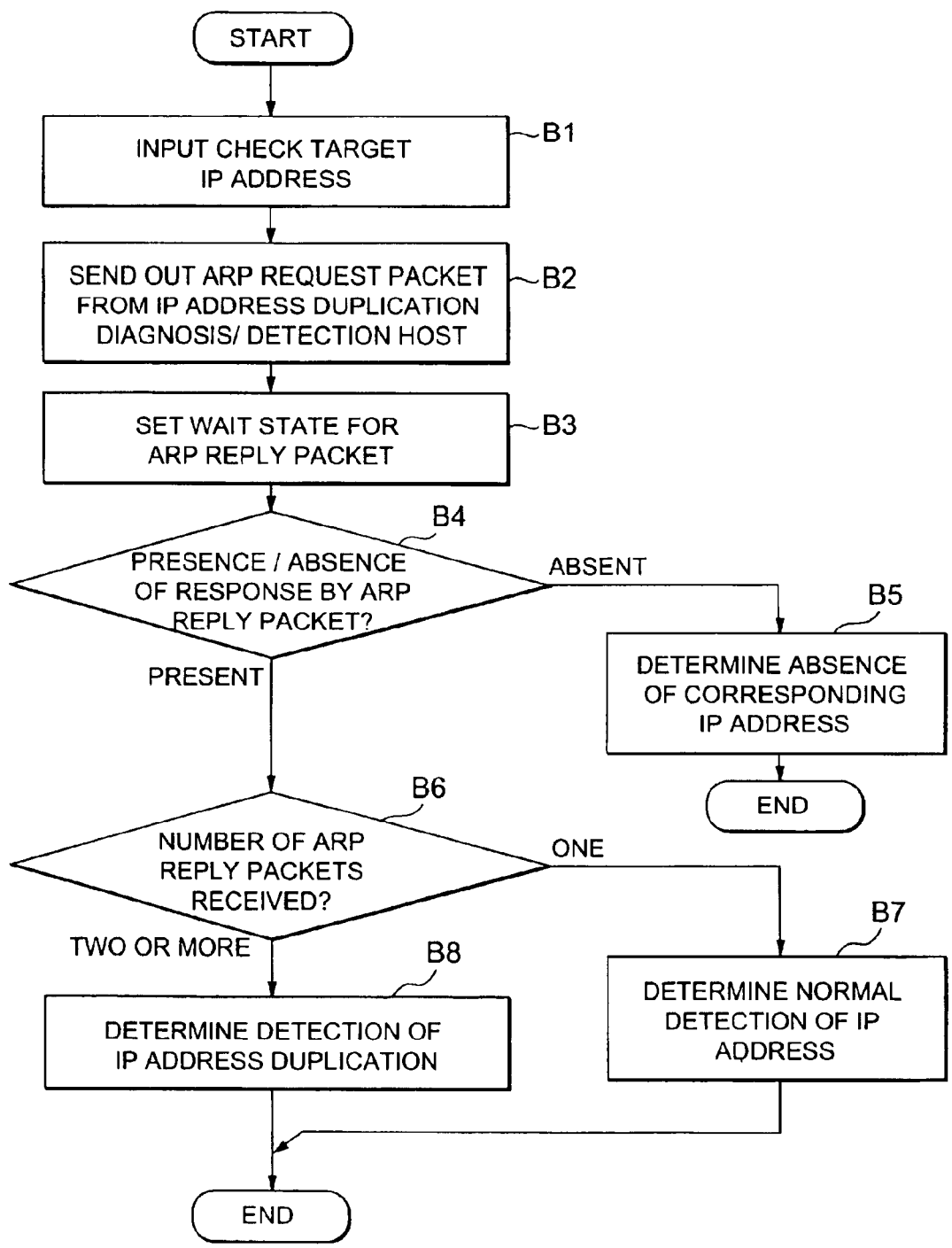
FIG. 2 is a flow chart showing an example of the processing flow in the first embodiment.

FIG. 2 is a flow chart showing an example of the processing flow in the first embodiment of the present invention.

Referring to FIG. 2, a check target IP address in the same subnet as for the IP address duplication diagnosis/detection host A1 is input to the IP address duplication diagnosis/detection host A1 (step B1), and an ARP request packet is sent out from the IP address duplication diagnosis/detection host A1 (step B2).

An ARP request packet is a packet forming ARP and used to obtain a MAC address corresponding to an IP address by using the broadcast ability of the MAC address.

A wait state for an ARP reply packet as a response to the ARP request packet is set with an appropriate period of time immediately after the ARP request packet is sent out (step B3). The duration of ARP reply packet wait state in the IP address duplication diagnosis/detection host is preferably set to an appropriate period of time in consideration of the transfer time characteristics of the LAN A3 and the protocol processing times required in the IP address duplication diagnosis/detection host A1 and check target hosts A21 to A2N.

When the response wait time has elapsed, it is checked in step B4 whether a response is made by an ARP reply packet.

An ARP reply packet is a packet forming ARP and is used in such a manner that a host having an IP address matching the IP address contained in an ARP request packet replies and notifies the ARP request packet source host of the MAC address of the self-host by assembling it in the ARP reply packet.

If it is determined in step B4 that no response by a ARP reply packet is present, it is determined that no IP address matching the check target IP address is present on the check target hosts A21 to A2N, and the processing is terminated (step B5).

If it is determined in step B4 that a response by an ARP reply packet is present, the number of ARP reply packets received is checked (step B6).

If it is determined in step B6 that only one ARP reply packet is received, it is determined that only one host has the check target IP address in the LAN A3, and the processing is normally terminated (step B7).

If it is determined in step B6 that two or more ARP reply packets are received, it is determined that two or more hosts have duplicate check target IP addresses in the LAN A3, and the IP address duplication diagnosis/detection is terminated (step B8).

Another embodiment (second embodiment) of the present invention will be described next.

According to the above description of the operation of the first embodiment of the present invention, duplication diagnosis is performed for input individual IP address. However, this method can be extended to a scheme of performing IP address diagnosis/detection for, an overall subnet by using a subnet address input as well as being used as a simple IP address duplication diagnosis/detection method.

IP addresses are classified into network addresses and host addresses according to subnet masks. A host address range can be uniquely determined by designating a subnet address. As a consequence, the range of corresponding IP addresses is determined.

The IP addresses determined by the above operation are input to step B1 in FIG. 2 one by one, and the states in steps B5, B7, and B8 as the output results are managed in the form of a list in a database. This makes it possible to consider each input IP address in one of the following states: "no assigned IP address", "IP address duplication", or "normal IP address assignment", thereby managing the IP addresses in the overall subnet.

The above extended scheme will be described in detail next with reference to the flow chart of FIG. 3.

Figure 3:
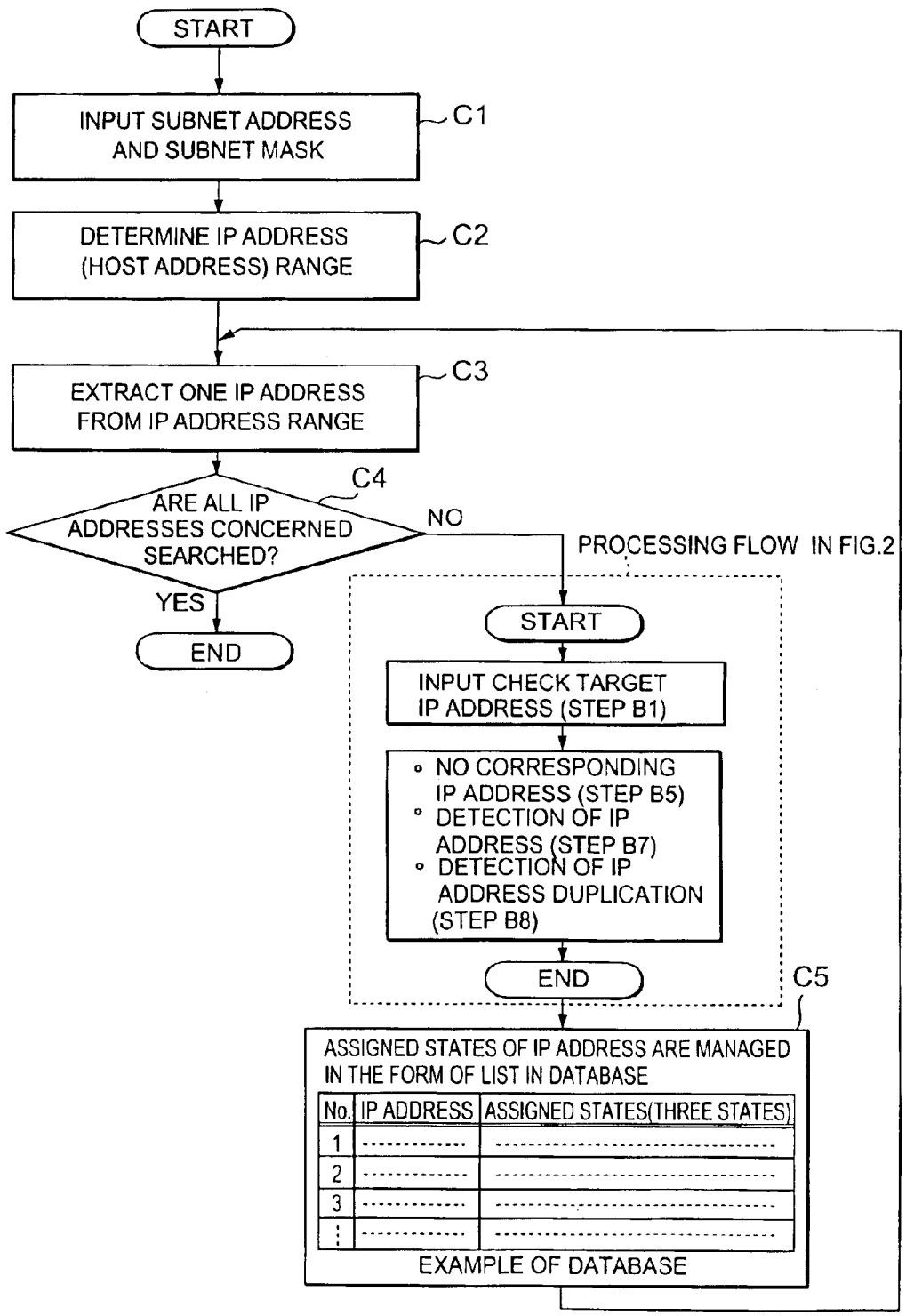
FIG. 3 is a flow chart showing another example of the processing flow in the first embodiment.

FIG. 3 is a flow chart showing an example of the operation flow in the second embodiment of the present invention.

Referring to FIGS. 3 and 2, in step C1, the subnet address and subnet mask of the same subnet as for an IP address duplication diagnosis/detection host A1 in FIG. 1 are input to the host A1. As a result of the processing in step C1, a host address range can be uniquely determined (step C2).

One IP address is extracted from the host address range determined in step C2 by using an appropriate means (step C3). In step C4, all IP addresses in an appropriate range concerned are searched out without any duplication/omission.

In extracting one IP address in step C3, two host addresses, one with all "1"s and the other with all "0"s, are preferably excluded in advance from the addresses to be extracted because they correspond to broadcast addresses in the overall subnet.

If it is determined in step C4 that no appropriate IP address concerned is present, the processing is terminated. Otherwise, the IP address obtained in step C3 is input to step B1 in FIG. 2, and the processing in FIG. 2 is executed.

Each input IP address is managed in the form of a list in a database in correspondence with one of the following assigned states: "no assigned IP address" in step B5, "normal IP address assignment" in step B7, and "IP address duplication" in step B8. This makes it possible to manage the assigned state of each IP address.

After step C5, IP addresses that have not been checked are sequentially checked starting from step C3. Finally, the assigned states of IP addresses can be managed on the basis of database management on the subnet level for all the IP addresses within the corresponding range.

The processing flows in the respective embodiments of the present invention can be stored in a recording medium, and the medium can be distributed on the market.

What is claimed is:

1. An IP address duplication detection method using an address resolution protocol in a network system in which an IP address duplication diagnosis/detection host and a plurality of check target hosts are connected to a single LAN, all the hosts having MAC addresses as hardware addresses unique to devices without any duplication, there being an address resolution protocol aimed at acquiring a MAC address of a remote device from an IP address installed in each host, comprising the steps of:

sending out an ARP request packet containing a check target IP address in the same subnet as for the IP address duplication diagnosis/detection host from the IP address duplication diagnosis/detection host to each of the check target hosts through the LAN;

detecting IP address duplication depending on whether an ARP reply packet as a response packet for the ARP request packet is returned from each of the check target hosts to the IP address duplication diagnosis/detection host through the LAN; and maintaining a database listing for each said target IP address, said listing reflecting whether an ARP reply packet was received from no check target hosts, one check target host, or at least two check target hosts.

2. An IP address duplication detection method using an address resolution protocol in a network system in which an IP address duplication diagnosis/detection host and a plurality of check target hosts are connected to a single LAN, comprising the steps of:

inputting a check target IP address of the same subnet as for the IP address duplication diagnosis/detection host to the IP address duplication diagnosis/detection host, and sending out an ARP request packet from the IP address duplication diagnosis/detection host;

setting the IP address duplication diagnosis/detection host in a wait state for an ARP reply packet as a response packet for the ARP request packet immediately after the ARP request packet is sent out;

determining the presence/absence of a response by the ARP reply packet at the time of expiration of the wait state;

terminating the processing upon determining the absence of an IP address matching the check target IP address on the check target hosts if a result of the determination of the presence/absence of a response indicates the absence of a response, and determining the number of ARP reply packets received if the result indicates the presence of a response by the ARP reply packet;

normally terminating the processing upon determining that one host has the check target IP address in the LAN, if a result of the determination of the number indicates that one ARP reply packet is received, and completing the IP address duplication diagnosis/detection upon determining that not less than two hosts have duplicate check target IP addresses in the LAN, if the result indicates not less than two ARP reply packets are received; and maintaining a database listing for each said target IP address, said listing reflecting whether an ARP reply packet was received from no check target hosts, one check target host, or at least two check target hosts.

3. A method according to claim 2, wherein a duration of the wait state for an ARP reply packet set, which is set by the IP address duplication diagnosis/detection host, is set to a period of time in consideration of transfer time characteristics of the LAN and protocol processing times required by the IP address duplication diagnosis/detection host and the check target hosts.

4. A method according to claim 2, wherein all the hosts are respectively assigned MAC addresses as hardware addresses unique to devices without any duplication, and an address resolution protocol aimed at acquiring a MAC address of a remote device from an IP address is installed in each host.

5. A method according to claim 4, wherein network addresses in IP addresses which are obtained by ANDing the IP addresses and a subnet mask, which are network addresses as in the same subnet, are set to be the same in the IP address duplication diagnosis/detection host and the check target hosts.

6. A method according to claim 4, wherein the ARP request packet is a packet forming ARP and is used to obtain a MAC address corresponding to an IP address by using a broadcast ability of the MAC address.

7. A method according to claim 4, wherein the ARP reply packet is a packet forming ARP and used in such a manner that a host having an IP address matching an IP address contained in an ARP request packet replies and notifies the IP address duplication diagnosis/detection host as an ARP request packet source host of the MAC address of the self-host by assembling the MAC address in the ARP reply packet.

8. An IP address duplication detection method using an address resolution protocol in a network system in which an IP address duplication diagnosis/detection host and a plurality of check target hosts are connected to a single LAN, all the hosts having MAC addresses as hardware addresses unique to devices without any duplication, there being an address resolution protocol aimed at acquiring a MAC address of a remote device from an IP address installed in each host, comprising the steps of:

uniquely determining a host address range by inputting a subnet address of the same subnet as for the IP address duplication diagnosis/detection host to the IP address duplication diagnosis/detection host;

extracting one IP address from the determined host address range;

executing a search for all IP addresses in the corresponding range without any duplication/omission;

terminating processing if no IP address is present in execution of the search;

inputting, if an IP address is present, the extracted IP address as a check target IP address of the same subnet as for the IP address duplication diagnosis/detection host to the IP address duplication diagnosis/detection host, and sending out an ARP request packet from the IP address duplication diagnosis/detection host, setting the IP address duplication diagnosis/detection host in a wait state for an ARP reply packet as a response packet for the ARP request packet immediately after the ARP request packet is sent out, determining the presence/absence of a response by the ARP reply packet at the time of expiration of the wait state, terminating the processing upon determining the absence of an IP address matching the check target IP address on the check target hosts if a result of the determination of the presence/absence of a response indicates the absence of a response, and determining the number of ARP reply packets received if the result indicates the presence of a response by the ARP reply packet, and normally terminating the processing upon determining that one host has the check target IP address in the LAN, if a result of the determination of the number indicates that one ARP reply packet is received, and completing the IP address duplication diagnosis/detection upon determining that not less than two hosts have duplicate check target IP addresses in the LAN, if the result indicates not less than two ARP reply packets are received;

managing each of states including "no assigned IP address", "normal IP address assignment", and "IP address duplication" as an assigned state result of each input IP address in the form of a list in a database in correspondence with each input IP address; and managing an assigned state of an unchecked IP address by executing the same detection processing on the basis of database management on an overall subnet level.

9. A method according to claim 8, wherein a host address having all bits set to "1" or "0" is excluded in advance from addresses to be extracted when the IP address is extracted.

* * * * *